March 8, 1938.  B. HEILMAN ET AL  2,110,665
WIREWORKING MACHINE
Filed Nov. 14, 1935  7 Sheets-Sheet 1

Fig. 1.

INVENTORS
Bernard Heilman
Earl Peck
BY
Chappell, Earl & Chappell
ATTORNEYS

Fig. 3.

INVENTORS
Bernard Heilman
Earl Peck
BY
ATTORNEYS.

March 8, 1938.  B. HEILMAN ET AL  2,110,665
WIREWORKING MACHINE
Filed Nov. 14, 1935    7 Sheets-Sheet 6

Fig_11_

Fig_10_

Fig_14_

Fig_12_

Fig_13_

INVENTORS
Bernard Heilman
Earl Peck
BY Chappell, Earl & Chappell
ATTORNEYS

SINGLE CONE CONVENTIONAL SPRINGS

INVENTOR.
Bernard Heilman
Earl Peck

Patented Mar. 8, 1938

2,110,665

UNITED STATES PATENT OFFICE 2,110,665

WIREWORKING MACHINE

Bernard Heilman and Earl Peck, Detroit, Mich., assignors to L. A. Young Spring & Wire Corporation, Detroit, Mich.

Application November 14, 1935, Serial No. 49,742

39 Claims. (Cl. 140—79)

The main objects of this invention are:

First, to provide an improved coil forming machine which may be readily adjusted for forming coils having a wide range in the matter of shape and size or diameter.

Second, to provide a coiling machine in which the several coils may be varied in diameter throughout a wide range thereby enabling the production of coiled springs of desired characteristics.

Third, to provide a machine having these capabilities in which the form control means are mainly through threaded or screw adjustments, thereby providing accuracy and stability.

Objects pertaining to details and economies of our invention will definitely appear from the description to follow. The invention is defined in the claims.

A structure embodying the features of our invention is clearly illustrated in the accompanying drawings, in which.

Figure 1:
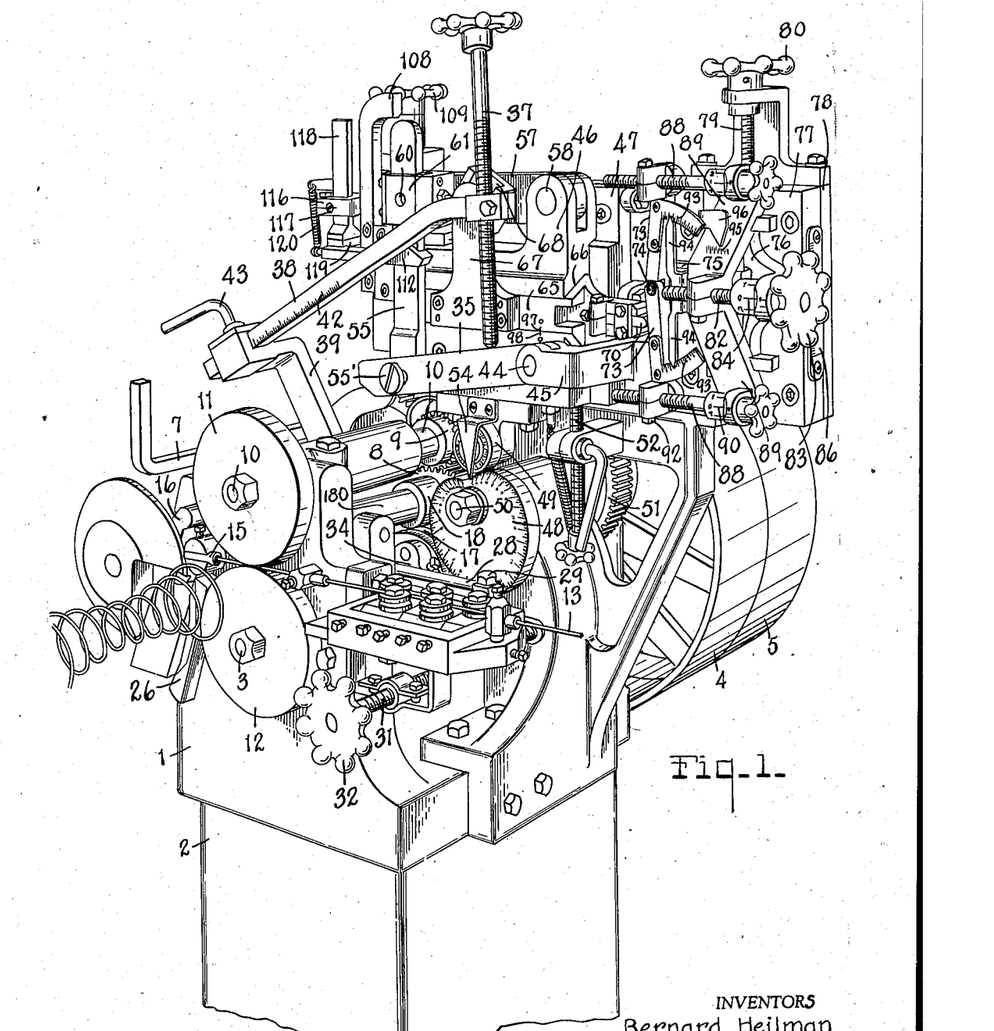
Fig. 1 is a perspective view of a spring coiling machine embodying the features of our invention.
Figure 2:
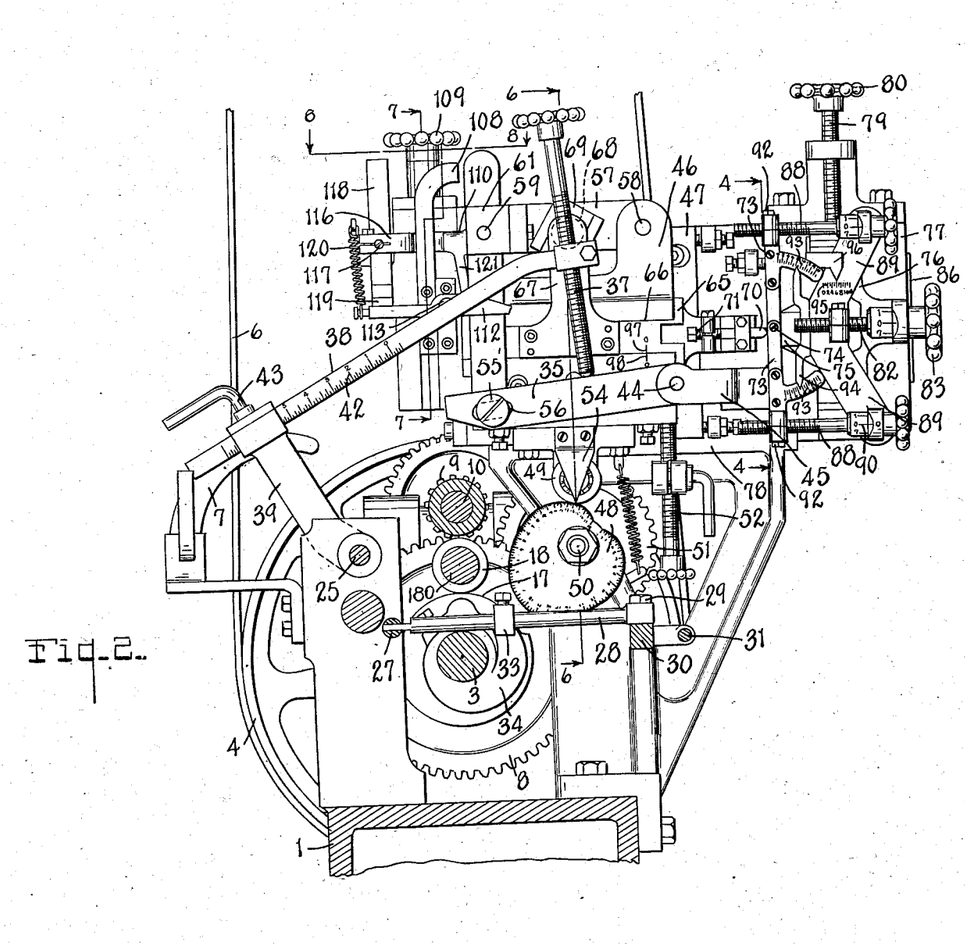
Fig. 2 is a vertical longitudinal section.

In the embodiment of our invention illustrated in the accompanying drawings, the supporting frame designated generally by the numeral 1 is of suitable form and size to support the various working parts and this is preferably a casting supported on a suitable pedestal 2. The main drive shaft 3 is provided with tight and loose pulleys 4 and 5, the drive belt being shown at 6, Fig. 2, and the belt shifter at 7. The drive shaft is provided with a driving gear 8 which meshes with a gear 9 on the shaft 10 of the upper feed roller 11. The lower coacting feed roll 12 is loosely mounted on the end of the shaft 3. These feed rollers coact to feed the wire 13 through the guide 15 against the coiler block 16.

The bearing for the shaft 10 is floatingly mounted to be raised from and lowered into driving engagement with the wire by means of the cam 17 on the shaft 3, the cam coacting with a roller 18, which is carried by an arm 180 pivotally mounted whereby when the arm is raised by the cam, shaft 10 will be actuated thereby to lower upper feed roller into feeding relation to wire 13. This cam 17 is made up of two adjustably associated members 19 and 20. The cam member 19 is rotatably mounted on the hub 21 and is secured in its adjusted positions thereon by the set screw 22. It will be noted that the cam member 19 is provided with scale indicia 23 operatively associated with the pointer 24 on the member 20. The lifts and dwells of these cam members are complementary so that by adjusting them relative to each other the length of wire fed at each cycle is accurately determined.

The movable mounting for the shaft 10 of the upper feed roll 11 is not detailed as mountings suitable for this purpose are known in the art. It will be understood that the wire is fed only when the feed rollers are in feeding engagement therewith so that by adjusting the cam to regulate the length of dwell therein the length of the wire feed is accurately controlled.

The coiler block 16 is mounted on the rockshaft 25. A pitch block 26 is operatively associated with the forming block and mounted on the slide rod 27, see Figs. 2 and 3. The slide rod is actuated by the arm 28 pivoted at 29, the pivot being mounted on the slide 30 by means of the screw 31 having handwheel 32. The arm 28 carries a cam follower 33 coacting with the cam 34 which permits accurate adjustment of the pitch block or member to regulate the pitch of the coil.

The coil block 16 is controlled by several factors, the coaction of which results in producing a coil of the desired shape, and certain of these features are adjustable so that the resulting coil may be of the desired shape and very wide range or variety of shapes is possible without the necessity for introducing specially shaped or designed cams or elements to secure the result desired.

The forming arm or lever 35 has a grooved upper edge 36 in which the follower 37 rides, this follower being carried by the rocker 38 adjustably engaging with the arm 39 on the forming member rockshaft 25. The rocker 38 is preferably provided with scale indicia 42 facilitating the adjustment of the arm 39 thereon, a locking set screw 43 being provided for holding the arm 39 in its adjusted position. The forming lever 35 is pivoted at 44 on a bracket 45 on the main frame or on a fixed part of the frame.

At one side of the forming lever 35 is a vertically movable slide or carriage 46 which is guided and supported in its movement by the slideway 47. This carriage is actuated by the cam 48 coacting with the roller 49 on the carriage. The cam 48 is mounted on a shaft 50 connected to the main driving shaft 3 by suitable train of gears, one of which is shown at 51, so that the cam is driven in synchronism with the feed rolls. An adjustable stop 52, preferably in the form of a screw, is provided for limiting the downward movement of the carriage, the adjustment of this stop determining the point at which the cam 48 engages the roller 49. This adjustment of the stop and consequent timing of the engagement of the roller with the cam, or determination of the point of engagement, in effect determines the length of the dwell of the cam, that is, the period of time during which the carriage is at rest. The cam is provided with a definite dwell portion 53 which gives sufficient time for actuation of the cut-off under any circumstances or any adjustment.

Figure 3:
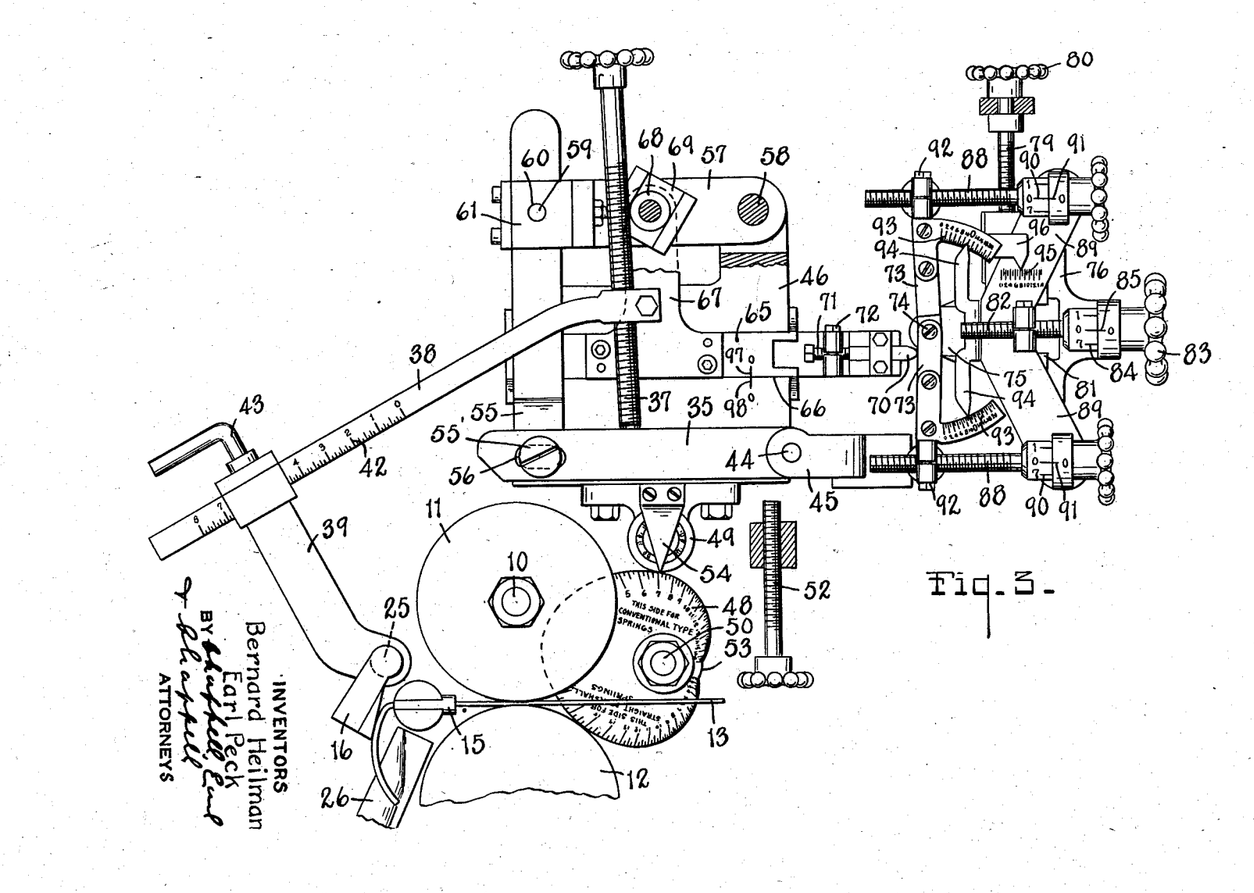
Fig. 3 is a fragmentary diagrammatic view with certain parts shown in section illustrating the relation of the form or shape controlling means to the coiler proper.
Figures 4, 5:
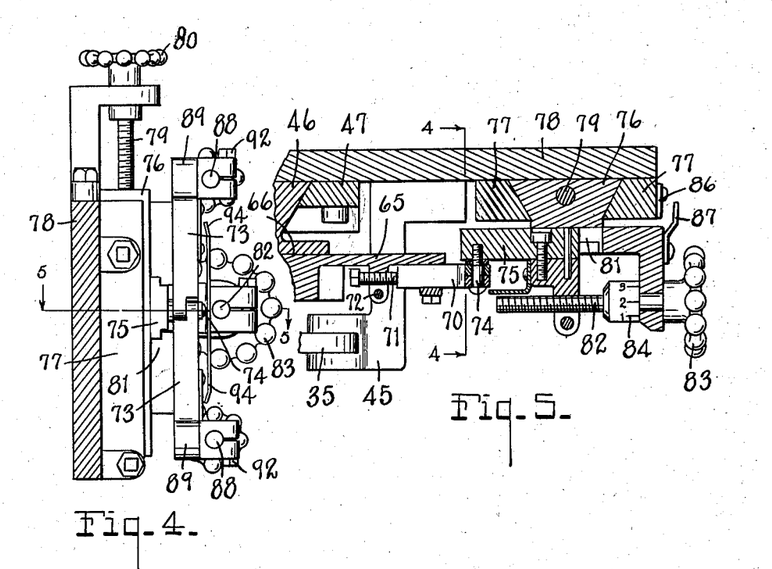
Fig. 4 is an enlarged detail section through the form control means on a line corresponding to line 4—4 of Figs. 2 and 5.
Fig. 5 is an enlarged fragmentary view mainly in section on a line corresponding to line 5—5 of Fig. 4.
Figure 6:
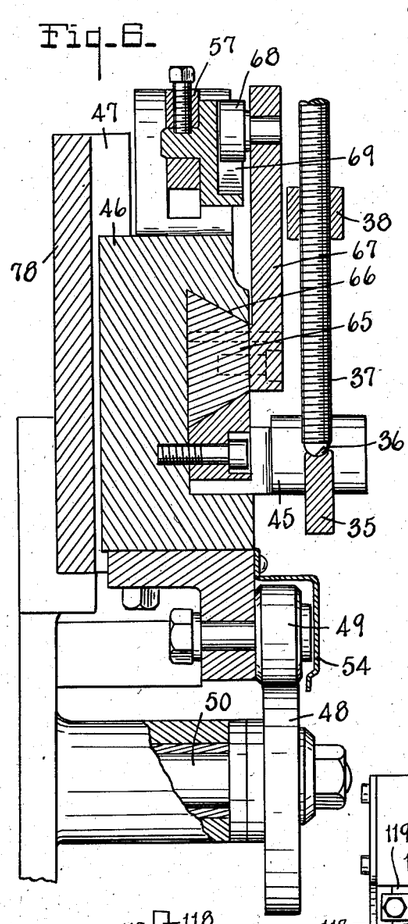
Fig. 6 is an enlarged detail view mainly in section on a line corresponding to line 6—6 of Fig. 2 illustrating details of the coiler block actuating mechanism.
Figure 7:
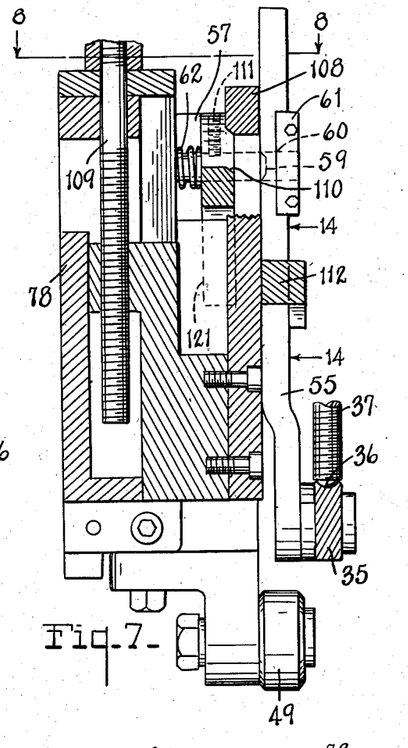
Fig. 7 is an enlarged detail view mainly in section on a line corresponding to line 7—7 of Figs. 2 and 8 showing further details of the coiler control or actuating mechanism.

To facilitate the adjustment for different lengths of spring, or, more specifically, the wire used in the spring, the cam 48 is provided with scale or gaging indicia operatively associated with a pointer 54 centered relative to the axis of the roller 49, that is alined with the point of contact of the roller with the cam, see Fig. 3. This scale indicia is preferably oppositely arranged, the numbering from one side of the cam being from the point of the lift toward the dwell and on the other side from the dwell toward the point of lift of the cam. In some types of springs, for example, the Marshall type, the end coils are smaller in diameter than the intermediate coils. When such a spring is to be formed, the cam is reversed, that is, shifted so that at the starting point in the spring forming operation roller 49 engages the cam so that the movement of the cam relative to the roller is toward the dwell instead of toward the lift of the cam as shown in Fig. 3, for example.

The forming lever 35 is connected to the carriage by the link 55 pivoted at 55', the pivot engaging a slot 56 in the forming lever. This link is connected to the lever 57 pivoted at 58 on the carriage 46 by means of the pin 59 which engages a hole 60 in the link, the link passing through a loop or strap 61 on the lever 57. The pin is urged to engaging position by means of the coiled spring 62.

Figure 15:
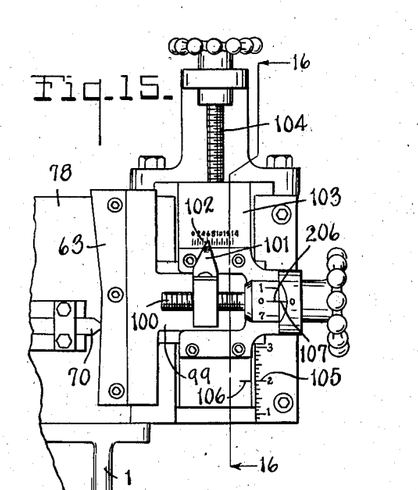
Fig. 15 is a fragmentary side elevation in which the shape controlling cam or member 63 is of predetermined design.
Figure 16:
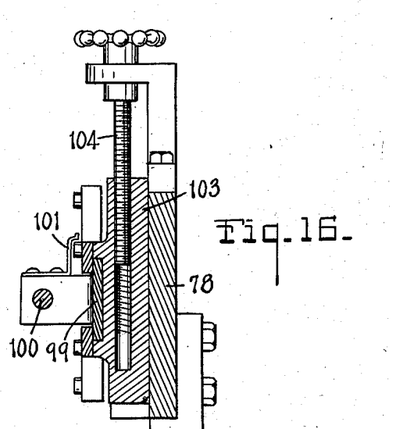
Fig. 16 is a fragmentary section on line 16—16 of Fig. 15.

To produce springs varying in form from the true cone shape, the forming lever 35 is actuated with a movement compounded from or the result of the action of the cam 48 and a form control means which, in its simplest embodiment as shown in Fig. 15, may be in the form of a cam plate 63, but which in its preferred embodiment, as shown in Figs. 1–14, inclusive, comprises adjustable coil shaping means which enables in the one machine the forming of springs of a great variety of shapes or design.

This mechanism in the embodiment illustrated, comprises a slide 65 mounted in the slideway 66 in the carriage 46 to reciprocate in a horizontal path or in a path at right angles to the path of reciprocation of the carrier. This slide carries an arm 67 having a roller 68 thereon engaging a cam slot 69 on the lever 57 so that the movement of the lever 57 is, as stated, a resultant of the vertical reciprocation of the carriage and the reciprocation of the slide 65 so that by controlling and timing the movement of the slide 65 any shaped spring may be produced within the limits of the machine, this compound of actuating forces being imparted to the forming lever 35 which actuates the former as described.

The slide 65 is provided with a tracer or follower 70 which is adjustably mounted on the slide. A threaded thrust member 71 is provided for the follower, see Fig. 3, and a clamping screw 72 is provided for securing the thrust member in its adjusted positions. This follower coacts with a pair of cam or shaping members 73 pivotally mounted at 74 on the adjustable slide 75 mounted on the vertically adjustable support 76. This support 76 is supported in suitable ways 77 on the bracket 78, its vertical adjustment being accomplished by the screw 79 provided with a handwheel 80. The slide 75 is mounted in a way 81 on the support 76 and is adjusted thereon by means of a screw 82 having a suitable hand wheel 83. The screw 82 is provided with scale or adjusting indicia 84 operatively associated with a pointer 85 on a fixed part of the carrying slide 76.

One of the way members for the vertically adjustable support 76 is provided with scale or adjustment indicia 86 which is provided with a pointer 87 associated with this indicia to indicate adjustment thereof.

The shaping members 73 are each provided with an adjusting and supporting screw 88 rotatably mounted on the arms 89 on the slide 75. These adjusting screws have threaded engagement with the outer ends of the member 73 and are provided with scale indicia 90 operatively associated with the pointer 91 on the arms 89. Clamping screws 92 extend through a split boss in the outer ends of member 73 and are provided for securing these parts to their adjusting screws.

To facilitate the adjustment of the shaping members 73 they are each provided with a scale indicia member 93 operatively associated with pointers 94, see Fig. 3, and to facilitate the adjustment of the slide 75 it is provided with a gaging indicia 95 operatively associated with a pointer 96 carried by the vertically movable slide 76. It will be noted that as the carriage 46 is reciprocated by the cam 48 the follower 70 travels up and down or slides up and down on the shaping members 73, the parts being held in contact by gravity. One portion of the spring is formed during the upward travel of the carriage 46 and the other portion during the downward travel. The vertical adjustment of the support 76 determines the point in the forming of the spring at which the formers 73 begin to function in the shaping of the spring. The adjustment of the support 75 for the forming members 73 adjusts their inner ends, and the adjustment of their outer ends through the screws 88 determines their angular relation to each other.

These several adjustments enable the very accurate shaping of the spring and the adjustment of the machine for forming springs of various contours, that is, varying the size of the end coils, commonly of large diameter, relative to the other coils and the relative diameter of the intermediate coils. By this means springs can be produced of the character shown in Fig. 11, for example, in which the relative diameters of the coils are such that there can be no clashing and the springs could be completely collapsed.

Figure 10:
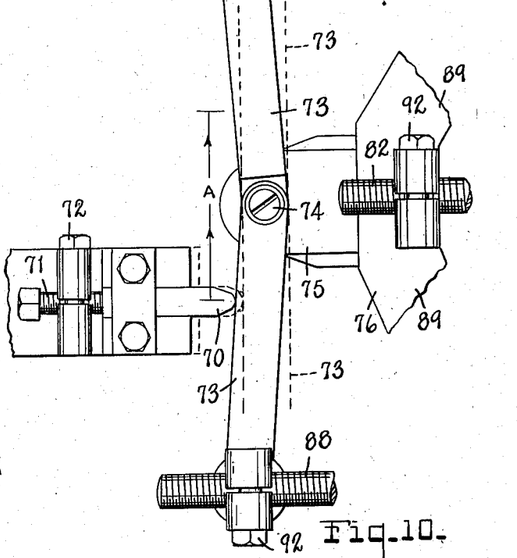
Figs. 10 and 11 are a fragmentary view of the spring shaping means and the shaped spring resulting when the parts are in the position shown in full lines, the dotted lines of these figures indicating the result when the form control means is adjusted to a neutral position.
Figure 11:
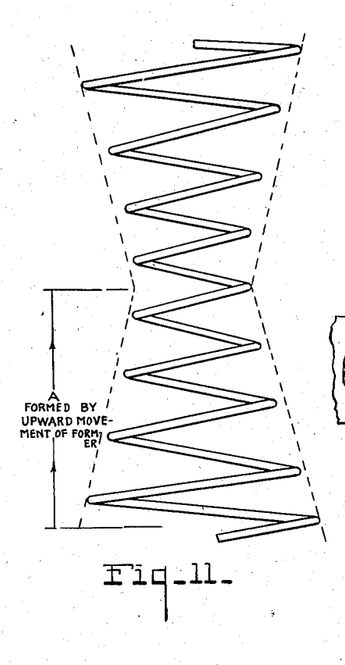
Figure 12:
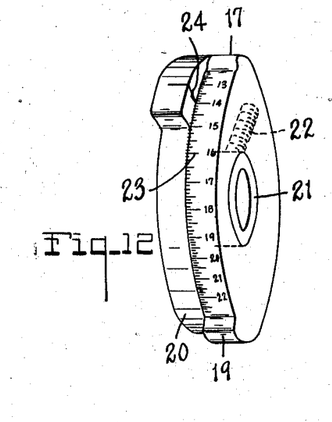
Fig. 12 is a perspective view of the wire feed cam which determines the length of wire fed for each forming operation.

To produce a spring having true double conical shape as shown in Fig. 11, the forming members should be brought into alinement as shown by dotted lines in Fig. 10, or, in other words, if they were in position shown by dotted lines in Fig. 10 the result would be a spring of the shape indicated by the dotted lines of Fig. 11, and this results from the action of the cam 48, the forming members 73 being neutralized.

To adjust the machine to produce a spring having end coils of a predetermined diameter and to shape the intermediate coils the screw 82 is adjusted to allow the pointer 97 on the slide to move to the right from the pointer 98 on the carriage 46. The machine is then actuated to drop the carriage 46 to its lowest point. The lower screw 88 is then adjusted to move the slide 65 toward the left until the pointer 97 again registers with the pointer 98. The machine is then actuated to lift the carriage to its upper limit, which permits the slide to move toward the right, the upper screw 88 then being adjusted until the pointers 97 and 98 are again brought into alinement. The adjustment described would produce a spring of the type shown in Fig. 11, which is symmetrical in both halves.

A wide variation from this may be had by the adjustments of the parts described, for example, one portion of the spring may be made cylindrical and the other shaped as in Fig. 11; in fact, almost any result within the limits of the machine can be secured.

The machine may be used for determining the shape of pattern cams or plates 63, as shown in the modification of Fig. 15, for example, if it were desired to manufacture large numbers of springs of a particular type or design, a machine such as has been described might be employed for determining the shape of the pattern member 63 for embodiment in machines designed for a particular product. In that embodiment the slide or adjustable support 99 corresponds to the support 75 and is adjusted by means of the screw 100, the support 99 carrying a pointer 101 coacting with adjustment indicia 102 on the vertically adjustable support 103 which is adjusted by means of the screw 104. One of the slideways for the support 103 is provided with adjustment indicia 105, while the adjustable support has a pointer 106 coacting therewith to facilitate the vertical adjustment of the member 103.

The adjusting screw 100 is provided with adjustment indicia 206 which is associated with the pointer 107, further facilitating adjustment, this in effect being a micrometer or fine adjustment.

Figures 13, 14:
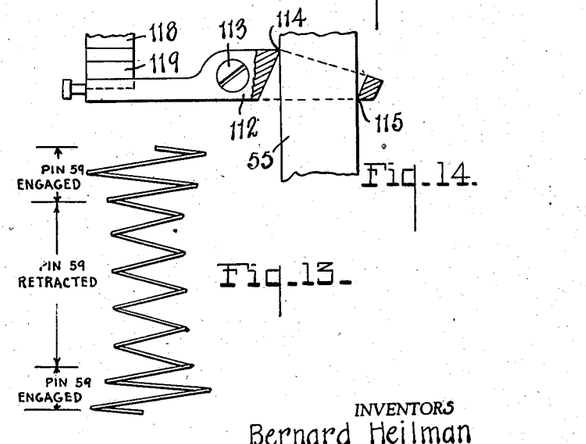
Fig. 13 is a side elevation of another form of spring which may be produced with the machine, this spring having a cylindrical central portion with enlarged end coils.
Fig. 14 is an enlarged detail section on line 14—14 of Fig. 7 showing the details of the forming arm supporting clutch.

The machine is also adapted for forming springs having a cylindrical intermediate portion as shown in Fig. 13. To accomplish this means are provided for retracting the pin 59 during a part of the stroke. This means comprises a tappet 108 which, during the operation of the machine as previously described, is adjusted so that it does not function. This tappet is adjustably supported by means of the screw 109 into position to engage the cam 110 at a predetermined point in the stroke. This cam 110 is secured to the pin by the set screw indicated at 111 so that the pin is retracted against the thrust of its spring, thus permitting movement of the carriage 46 without moving the link 55 and consequently the former lever 35.

Figure 8:
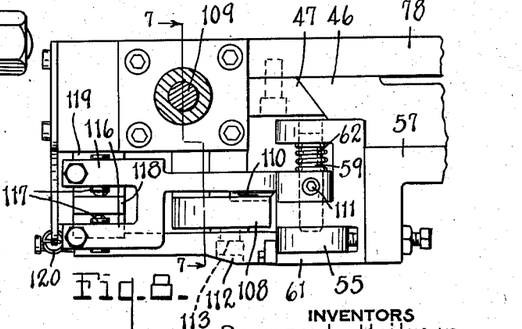
Fig. 8 is a fragmentary horizontal section on a line corresponding to line 8—8 of Figs. 2 and 7.
Figure 9:
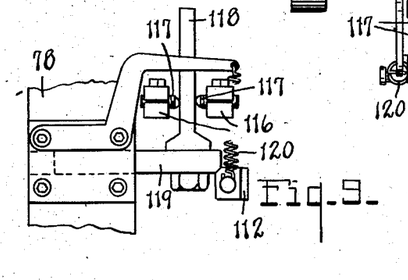
Fig. 9 is a fragmentary elevation looking from the left of Figs. 2 and 8.

To hold the former lever in a fixed position for this predetermined period a clutch 112 is provided to coact with the link 55, see Figs. 8, 9, and 14. This clutch is pivoted at 113 and has jaws or engaging surfaces 114 and 115. The jaw 114 acts to hold the link against downward movement while the jaw 115 acts to hold it against upward movement. The cam member 110, see Fig. 8, is forked at 116, these forks carrying screws 117 engaging opposite sides of the arm 118 on the transverse slide 119, which coacts with the clutch 112 which is urged to engaging position by the spring 120 so that, when the slide 119 is retracted through the actuation of the tappet 108, the clutch is allowed to function to grip the link 55 on opposite sides thereof and hold it in whatever position it may be at the time the pin is retracted, and retaining it in that position until, on return stroke, the pin releasing member 110 is released or disengaged from the tappet 108, whereupon slide 119 engages the clutch to release it against the resistance of spring 120.

To prevent the pin releasing cam from dropping above the tappet 108 the cam member is provided with an extension or tail 121 which rides on the inner face of the tappet member during the upstroke. When the pin releasing cam is released from the tappet it moves forward to pin engaging position, and this simultaneously moves the member 119 forwardly to disengage the clutch so that, during the remainder of the stroke, the pin is in engagement and the forming lever 35 is actuated.

Figure 17:
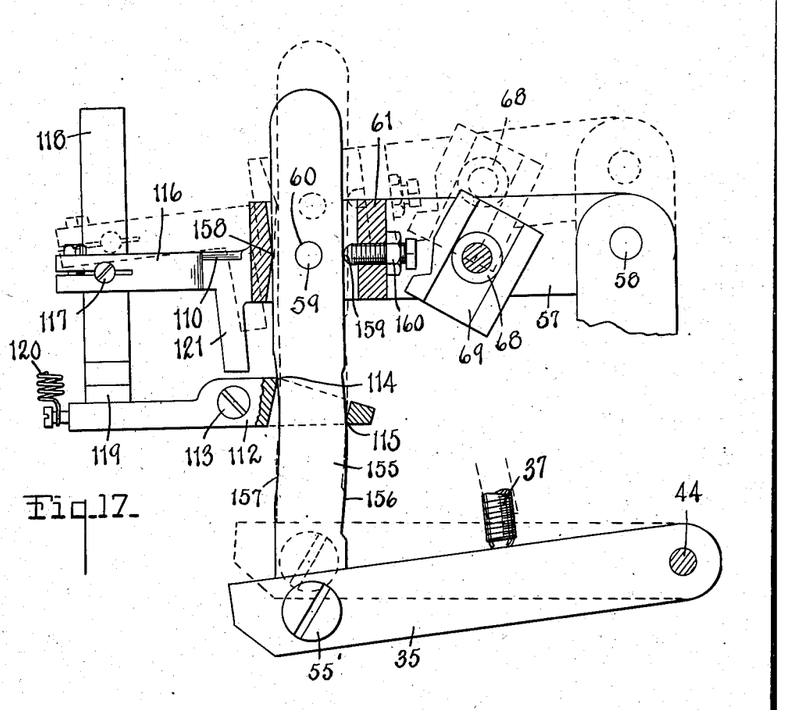
Fig. 17 is a fragmentary view partially in section showing a modified form or embodiment of the forming lever connections.

In the embodiment shown in Fig. 17 the pivot 55' connecting the link 155 to the forming arm 35 engages a hole in the forming lever instead of a slot as shown. In this embodiment the link 155 is provided with concentrically curved edges 156, 157 with which the clutch 112 coacts, the purpose of these arcs being to provide engaging surfaces for the clutch which maintain their same relation thereto throughout the stroke of the forming lever, or, in other words, throughout the movement of the link relative to the clutch.

To permit the rocking movement of the link incident to or resulting from the swinging of the forming arm the lever 57 is provided with opposed points of support 158 and 159 on which the link may tilt or rock as is indicated by dotted lines in Fig. 17. One of these supporting points is preferably in the form of a screw threaded for adjustment, the nut 160 being provided for holding in its adjusted positions. The coacting relation of the parts is that of the structure described.

Figure 18:
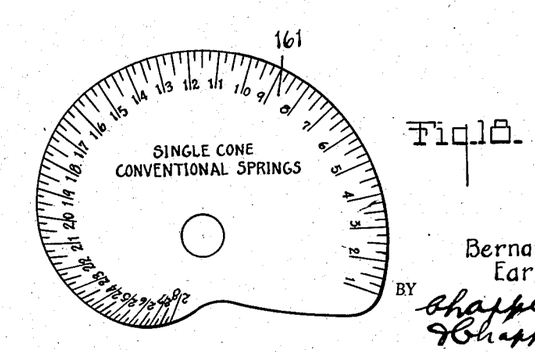
Fig. 18 is a side view of the master cam which may be employed for making single cone springs.

In Fig. 18 we illustrate a cam 161 which may be substituted for the cam 48 when it is desired to form a single cone spring as distinguished from a double cone spring.

With the parts thus arranged the machine may, as stated, be adjusted for the production of springs varying greatly in form or shape. For example, the machine may be used to form double springs of the hour glass type, that is, double conical springs in which the double coils are at the ends, or it may be used to form cylindrical springs in which the end coils are smaller than the body or intermediate coils of the spring, or for the forming of single cone springs, and the shape of the springs may be varied as desired; that is, the relative diameters of adjacent coils of a spring may be very widely varied, thus enabling the production of springs having the desired characteristics.

We have illustrated and described our invention in highly practical embodiments. We have not attempted to illustrate or describe other modifications or adaptations of our invention as it is believed this disclosure will enable those skilled in the art to embody or adapt our invention as may be desired.

Having thus described our invention what we claim as new and desire to secure by Letters Patent is:

1. In a coiling machine, the combination with a pivoted coiler member and feed means operatively associated therewith, of a pivoted forming lever, a rocker arm adjustably connected with said coiler member and having a follower adjustable thereon slidably engaging said forming lever, a carriage reciprocating in a plane parallel to the plane of travel of said forming lever, a graduated heart-shaped symmetrical cam for actuating said carriage, said carriage being provided with a roller cam follower, an adjustable stop limiting the movement of said carriage toward said cam whereby the point of engagement of the carriage cam follower with the cam may be determined, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, means for actuating said slide comprising a pair of coil shape controlling members mounted at their inner ends to swing on the same axis and to coact with said follower on said slide on said carriage, a supporting slide for said shaping members adjustable in a plane parallel to the path of travel of said reciprocating slide, screw adjusting means for the outer ends of said coil shape controlling members, a vertically adjustable support for said coil shape controlling member slide, and screws for adjusting said slide and its said support, said screws for adjusting the outer ends of said shape controlling members and said slide and support having gaging indicia operatively asociated therewith to facilitate engagement, said slide on said carriage also being provided with positioning indicia.

2. In a coiling machine, the combination with a pivoted coiling member and feed means operatively associated therewith, of a pivoted forming lever, a rocker adjustably connected with said coiling member and having a follower adjustable thereon slidably engaging said forming lever, a carriage reciprocating in a plane parallel to the plane of travel of said forming lever, a graduated heart-shaped symmetrical cam for actuating said carriage, said carriage being provided with a roller cam follower, an adjustable stop limiting the movement of said carriage toward said cam whereby the point of engagement of the carriage cam follower with the cam may be determined, an actuating lever pivotally mounted on said carriage, a link connecting said actuating lever to said forming lever, a slide on said carriage reciprocating in a path transverse to the path of the carriage, and provided with a follower, said actuating lever being provided with a cam and said slide with a follower engaging said cam whereby the actuating lever is actuated by the combined action of the carriage and the slide, means for actuating said slide comprising a pair of coil shape controlling members mounted at their inner ends to swing on the same axis and to coact with said follower on said slide on said carriage, a supporting slide for said shape controlling members adjustable in a plane parallel to the path of travel of said reciprocating slide, adjusting means for the outer ends of said coil shape controlling members, and a vertically adjustable support for said coil shape controlling member slide.

3. In a coiling machine, the combination with a pivoted coiler member and feed means operatively associated therewith, of a pivoted forming lever, a rocker arm connected with said coiler member and having a follower slidably engaging said forming lever, a carriage reciprocating in a plane parallel to the plane of travel of said forming lever, a cam for actuating said carriage, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, means for actuating said slide comprising a pair of coil shape controlling members mounted at their inner ends to swing on the same axis and to coact with said follower on said slide on said carriage, a supporting slide for said shape controlling members adjustable in a plane parallel to the path of travel of said reciprocating slide, screw adjusting means for the outer ends of said coil shape controlling members, a vertically adjustable support for said coil shape controlling member slide, and screws for adjusting said slide and its said support, said screws for adjusting the outer ends of said controlling members and said slide and support having gaging indicia operatively associated therewith to facilitate engagement, said slide on said carriage also being provided with positioning indicia.

4. In a coiling machine, the combination with a pivoted coiler member and feed means operatively associated therewith, of a pivoted forming lever, a rocker arm connected with said coiler member and having a follower slidably engaging said forming lever, a carriage reciprocating in a plane parallel to the plane of travel of said forming lever, a cam for actuating said carriage, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, means for actuating said slide comprising a pair of coil shape controlling members mounted at their inner ends to swing on the same axis and to coact with said follower on said slide on said carriage, a supporting slide for said shape controlling members adjustable in a plane parallel to the path of travel of said reciprocating, adjusting means for the outer ends of said coil shape controlling members, and a vertically adjustable support for said coil shaping member slide.

5. In a coiling machine, the combination with a pivoted coiler member and feed means operatively associated therewith, of a pivoted forming lever, a rocker arm adjustably connected with said coiler member and having a follower adjustable thereon slidably engaging said forming lever, a carriage reciprocating in a plane parallel to the plane of travel of said forming lever, a graduated heart-shaped symmetrical cam for actuating said carriage, said carriage being provided with a roller cam follower, an adjustable stop limiting the movement of said carriage toward said cam whereby the point of engagement of the carriage cam follower with the cam may be determined, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, and means for actuating said slide as the carriage is reciprocated comprising a plurality of members adjustable to vary their angular relation to each other and mounted to be adjusted transversely of the path of the slide and also as a unit in a plane parallel to the path of travel of the slide.

6. In a coiling machine, the combination with a pivoted coiler member and feed means operatively associated therewith, of a pivoted forming lever, a rocker arm connected with said coiler member and having a follower slidably engaging said forming lever, a carriage reciprocating in a plane parallel to the plane of travel of said forming lever, a cam for actuating said carriage, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, and means for actuating said slide as the carriage is reciprocated, comprising a plurality of members adjustable to vary their angular relation to each other and mounted to be adjusted transversely of the path of the slide and also as a unit in a plane parallel to the path of travel of the slide.

7. In a coiling machine, the combination with a pivoted coiler member and feed means operatively associated therewith, of a pivoted forming lever, a rocker arm adjustably connected with said coiler member and having a follower adjustable thereon slidably engaging said forming lever, a carriage reciprocating in a plane parallel to the plane of travel of said forming lever, a graduated heart-shaped symmetrical cam for actuating said carriage, said carriage being provided with a roller cam follower, an adjustable stop limiting the movement of said carriage toward said cam whereby the point of engagement of the carriage cam follower with the cam may be determined, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, and means for actuating said slide as the carriage is reciprocated.

8. In a coiling machine, the combination with a pivoted coiler member and feed means operatively associated therewith, of a pivoted forming lever, a rocker arm connected with said coiler member and having a follower slidably engaging said forming lever, a carriage reciprocating in a plane parallel to the plane of travel of said forming lever, a cam for actuating said carriage, an actuating lever pivotally mounted on said carriage, a link connecting said actuating lever to said forming lever, a slide on said carriage reciprocating in a path transverse to the path of the carriage and provided with a follower, said actuating lever being provided with a cam and said slide with a follower engaging said cam whereby the actuating lever is actuated by the combined action of the carriage and the slide, and means for actuating said slide as the carriage is reciprocated.

9. In a coiling machine, the combination with a coiler member and feed means operatively associated therewith, of a pivoted forming lever, a rocker adjustably connected with said coiler member and having an adjustable follower slidably engaging said forming lever, a reciprocating carriage, a cam for actuating said carriage, an actuating lever mounted on the carriage, a link connecting said actuating lever to said forming lever, a slide on said carriage reciprocating in a path transverse to the path of the carriage and operatively associated with said actuating lever, and means for actuating said slide as the carriage is reciprocated comprising a plurality of members adjustable to vary their angular relation to each other and mounted to be adjusted transversely of the path of the slide and also as a unit in a plane parallel to the path of travel of the slide.

10. In a coiling machine, the combination with a coiler member and feed means operatively associated therewith, of a pivoted forming lever, a rocker arm connected with said coiler member and slidably engaging said forming lever, a reciprocating carriage, a cam for actuating said carriage, an actuating lever mounted on the carriage, a link connecting said actuating lever to said forming lever, a slide on said carriage reciprocating in a path transverse to the path of the carriage and operatively associated with said actuating lever, and means for actuating said slide as the carriage is reciprocated comprising a plurality of members adjustable to vary their angular relation to each other and mounted to be adjusted transversely of the path of the slide and also as a unit in a plane parallel to the path of travel of the slide.

11. In a coiling machine, the combination with a coiler member and feed means operatively associated therewith, of a pivoted forming lever, a rocker arm connected with said coiler member and slidably engaging said forming lever, a reciprocating carriage, a cam for actuating said carriage, an adjustable stop limiting the movement of the carriage toward the cam whereby the point of engagement of the carriage with the cam may be determined, an actuating lever mounted on the carriage, a link connecting said actuating lever to said forming lever, a slide on said carriage reciprocating in a path transverse to the path of the carriage and operatively associated with said actuating lever, and means for actuating said slide as the carriage is reciprocated comprising a plurality of members adjustable to vary their angular relation to each other and mounted to be adjusted transversely of the path of the slide and also as a unit in a plane parallel to the path of travel of the slide.

12. In a coiling machine, the combination with a coiler member and feed means operatively associated therewith, of a pivoted forming lever, a rocker arm adjustably connected with said coiler member and having an adjustable follower slidably engaging said forming lever, a reciprocating carriage, a cam for actuating said carriage, an actuating lever mounted on the carriage, a link connecting said actuating lever to said forming lever, a slide on said carriage reciprocating in a path transverse to the path of the carriage and operatively associated with said actuating lever, and cam means for actuating said slide as the carriage is reciprocated.

13. In a coiling machine, the combination with a coiler member and feed means operatively associated therewith, of a pivoted forming lever, a rocker arm connected with said coiler member and slidably engaging said forming lever, a reciprocating carriage, a cam for actuating said carriage, an actuating lever mounted on the carriage, a link connecting said actuating lever to said forming lever, a slide on said carriage reciprocating in a path transverse to the path of the carriage and operatively associated with said actuating lever, and cam means for actuating said slide as the carriage is reciprocated.

14. In a coiling machine, the combination with a coiler member and feed means operatively associated therewith, of a pivoted forming lever, a rocker arm connected with said coiler member and slidably engaging said forming lever, a reciprocating carriage, a cam for actuating said carriage, an adjustable stop limiting the movement of the carriage toward the cam whereby the point of engagement of the carriage with the cam may be determined, an actuating lever mounted on the carriage, a link connecting said actuating lever to said forming lever, a slide on said carriage reciprocating in a path transverse to the path of the carriage and operatively associated with said actuating lever, and cam means for actuating said slide as the carriage is reciprocated.

15. The combination with a forming member and means for feeding stock to the same, of a forming lever having operating connections with said forming member, a carriage, a graduated heart-shaped symmetrical cam having a uniform lift throughout its periphery for actuating said carriage, said carriage being provided with a roller cam follower and with a pointer operatively associated with said graduated cam, an adjustable stop limiting the movement of said carriage toward said cam whereby the point of engagement of the carriage cam follower with the cam may be determined, an actuating lever on said carriage operatively connected with said forming lever, a slide on said carriage operatively connected with said actuating lever, and means for actuating said slide as the carriage is reciprocated comprising adjustable members mounted for adjustment relative to each other and as a unit toward and from and transversely of said slide.

16. The combination with a forming member and means for feeding stock to the same, of a forming lever having operating connections with said forming member, a carriage, a cam for actuating said carriage, an adjustable stop limiting the movement of said carriage toward said cam whereby the point of engagement of the carriage cam follower with the cam may be determined, an actuating lever on said carriage operatively connected with said forming lever, a slide on said carriage operatively connected with said actuating lever, and means for actuating said slide as the carriage is reciprocated comprising adjustable members mounted for adjustment relative to each other and as a unit toward and from and transversely of said slide.

17. The combination with a forming member and means for feeding stock to the same, of a forming lever having operating connections with said forming member, a carriage, a cam for actuating said carriage, an actuating lever on said carriage operatively connected with said forming lever, a slide on said carriage operatively connected with said actuating lever, and means for actuating said slide as the carriage is reciprocated comprising adjustable members mounted for adjustment relative to each other and as a unit toward and from and transversely of said slide.

18. The combination with a forming member and means for feeding stock to the same, of a forming lever having operating connections with said forming member, a carriage, a cam for actuating said carriage, an actuating lever on said carriage operatively connected with said forming lever, a slide on said carriage operatively connected with said actuating lever, and means for actuating said slide as the carriage is reciprocated.

19. The combination with a forming member and means for feeding stock to the same, of a forming lever having operating connections with said forming member, a carriage, means for reciprocating said carriage, an actuating lever on said carriage operatively connected with said forming lever, a slide on said carriage operatively connected with said actuating lever, means for actuating said slide comprising a pair of coil shape controlling members mounted at their inner ends to swing on the same axis and to coact with said slide on said carriage, a supporting slide for said shape controlling members adjustable in a plane parallel to the path of travel of said slide, screw adjusting means for the outer ends of said coil shape controlling members, a vertically adjustable support for said coil shape controlling member slide, and screws for adjusting said slide and its said support, said screws for adjusting the outer ends of said shape controlling members and said slide and support having gaging indicia operatively associated therewith to facilitate adjustment, said slide on said carriage also being provided with positioning indicia.

20. The combination with a forming member and means for feeding stock to the same, of a forming lever having operating connections with said forming member, a carriage, means for reciprocating said carriage, an actuating lever on said carriage operatively connected with said forming lever, a slide reciprocating transversely of the path of reciprocation of the carriage and operatively connected to said actuating lever, means for actuating said slide comprising a pair of coil shape controlling members mounted at their inner ends to swing on the same axis and to coact with said slide on said carriage, a supporting slide for said shape controlling members adjustable in a plane parallel to the path of travel of said first named slide, adjusting means for the outer ends of said coil shape controlling members, a vertically adjustable support for said coil shape controlling member slide, and means for adjusting said slide and its said support.

21. The combination with a forming member and means for feeding stock to the same, of a forming lever having operating connections with said forming member, a carriage, means for reciprocating said carriage, an actuating lever on said carriage operatively connected with said forming lever, a slide on said carriage operatively connected with said actuating lever, and means for actuating said slide as the carriage is reciprocated comprising adjustable members mounted for adjustment relative to each other and as a unit toward and from and transversely of said slide.

22. The combination with a forming member and means for feeding stock to the same, of a carriage, means for actuating said carriage, an actuating member on said carriage operatively connected to said forming member, a slide on said carriage operatively associated with said actuating lever, and means for actuating said slide as the carriage is actuated comprising angularly adjustable cam members mounted for adjustment to and from and transversely of said slide.

23. The combination with a forming member and means for feeding stock to the same, of a carriage, means for actuating said carriage, an actuating member on said carriage operatively connected to said forming member, a slide on said carriage operatively associated with said actuating lever, and means for actuating said slide as the carriage is actuated.

24. The combination with a forming member and means for feeding stock to the same, of a forming lever having operative connections with said forming member, a carriage, means for actuating said carriage, an actuating member carried by said carriage and operatively connected to said forming lever, and means for actuating said actuating member during the reciprocation of said carriage comprising adjustable members provided with screw adjusting means whereby they are positioned relative to each other and to the part engaging them.

25. The combination with a forming member and means for feeding stock to the same, of a forming lever having operative connections with said forming member, a carriage, means for actuating said carriage, an actuating member carried by said carriage and operatively connected to said forming lever, and means for actuating said actuating member during the reciprocation of said carriage.

26. In a coiling machine, the combination with a coiler member, of means for controlling said coiler member including a main forming cam adapted to actuate the forming member to produce a double conical type of helically coiled spring, and means cooperating therewith to modify the shape of the springs by varying the diameters of intermediate coils thereof irregularly relative to the diameter variations of other coils comprising a cam unit having adjustable pivotally associated members and screw means for adjusting said members.

27. In a coiling machine, the combination with a coiler member, of means for controlling said coiler member including a main forming cam adapted to actuate the forming member to produce a double conical type of helically coiled spring, and means cooperating therewith to modify the shape of the springs by varying the diameters of intermediate coils irregularly relative to the diameter variations of other coils of the spring comprising a cam unit adjustable to produce different variation.

28. In a coiling machine, the combination with a coiler member, of means for controlling said coiler member including a main forming means adapted to actuate the forming member to produce a double conical type of helically coiled spring having coils of uniformly varying character, and adjustable means cooperating therewith to modify the shape of the springs by varying the diameters of intermediate coils irregularly relative to the diameter variations of other coils.

29. In a coiling machine, the combination with a coiler member, of means for controlling said coiler member including a main forming means adapted to actuate the forming member to produce a double conical type of helically coiled spring having coils of uniformly varying character, and means cooperating therewith to modify the shape of the springs by varying the diameters of intermediate coils irregularly relative to the diameter variations of other coils.

30. The combination of a forming member, means for feeding stock to said member, a forming lever operatively connected to said forming member, a reciprocating carriage, a heart-shaped symmetrical cam for actuating said carriage, an actuating lever pivotally mounted on said carriage, a link for connecting said actuating lever to said forming lever, means for detachably connecting said link to said actuating lever comprising a spring pressed link engaging pin, a support adjustable in a plane of the path of travel of the pin provided with a pin releasing tappet cam, said pin being provided with a coacting cam brought into engagement therewith by the travel of the carriage, an automatically engaging clutch for holding said link in its released position, and means for automatically releasing said clutch on the return stroke of the carriage, said pin automatically engaging when the clutch is released, a slide on said carriage operatively associated with said actuating lever, and means for actuating said slide as the carriage is reciprocated comprising elements adjustable relative to each other and adjustable as a unit relative to said slide to vary the point of engagement of the slide therewith and the degree of actuation of the slide.

31. The combination of a forming member, means for feeding stock to said member, a forming lever operatively connected to said forming member, a reciprocating carriage, a heart-shaped symmetrical cam for actuating said carriage, an actuating lever pivotally mounted on said carriage, a link for connecting said actuating lever to said forming lever, means for detachably connecting said link to said actuating lever comprising a spring pressed link engaging pin, a support adjustable in a plane of the path of travel of the pin provided with a pin releasing tappet cam, said pin being provided with a coacting cam brought into engagement therewith by the travel of the carriage, an automatically engaging clutch for holding said link in its released position, and means for automatically releasing said clutch on the return stroke of the carriage, said pin automatically engaging when the clutch is released, a slide on said carriage operatively associated with said actuating lever, and means for actuating said slide as the carriage is reciprocated comprising a cam adjustable relative to said slide to vary the point of engagement of the slide therewith and the degree of actuation of the slide.

32. The combination of a forming member, means for feeding stock to said member, a forming lever operatively connected to said forming member, a reciprocating carriage, a heart-shaped symmetrical cam for actuating said carriage, an actuating lever pivotally mounted on said carriage, a link for connecting said actuating lever to said forming lever, means for detachably connecting said link to said actuating lever comprising a spring pressed link engaging pin, a support adjustable in a plane of the path of travel of the pin provided with a pin releasing tappet cam, said pin being provided with a coacting cam brought into engagement therewith by the travel of the carriage, an automatically engaging clutch for holding said link in its released position, and means for automatically releasing said clutch on the return stroke of the carriage, said pin automatically engaging when the clutch is released.

33. The combination of a forming member, means for feeding stock to said member, a forming lever operatively connected to said forming member, a reciprocating carriage, connections for said carriage to said forming lever including a link, means for detachably connecting said link to said carriage comprising a link engaging member, means for disengaging said link engaging member at a predetermined point in the travel of said carriage, said disengaging means being provided with a screw adjusting means, an automatically engaging clutch for holding said link in its released position and means for automatically releasing said clutch on the re-engagement of said link engaging means.

34. The combination of a forming member, means for feeding stock to said member, a forming lever operatively connected to said forming member, a reciprocating carriage, connections for said carriage to said forming lever including a link, means for detachably connecting said link to said carriage comprising a link engaging member, means for disengaging said link engaging member at a predetermined point in the travel of said carriage, an automatically engaging clutch for holding said link in its released position, and means for automatically releasing said clutch on the re-engagement of said link engaging means.

35. The combination of a forming member, means for feeding stock to said member, a forming lever operatively connected to said forming member, a reciprocating carriage, connections for said carriage to said forming lever including an actuating lever mounted on said carriage, disconnectible means for connecting said forming lever and actuating lever including means adjustably associated with said disconnectible means to be adjusted to and from operative relation therewith and to effect a disconnection at a predetermined point in the stroke of the carriage, a slide on said carriage operatively associated with said actuating lever, and means for actuating said slide as the carriage is reciprocated adjustable to vary the timing and the character of the stroke of the slide.

36. The combination of a forming member, means for feeding stock to said member, a forming lever operatively connected to said forming member, a reciprocating carriage, connections for said carriage to said forming lever including an actuating lever mounted on said carriage, disconnectible means for connecting said forming lever and actuating lever including means adjustably associated with said disconnectible means to be adjusted to and from operative relation therewith and to effect a disconnection at a predetermined point in the stroke of the carriage, a slide on said carriage operatively associated with said actuating lever, and means for actuating said slide as the carriage is reciprocated.

37. The combination of a forming member, means for feeding stock to said member, a forming lever operatively connected to said forming member, a reciprocating carriage, connections for said carriage to said forming lever including an actuating lever mounted on said carriage, means for disconnecting said forming lever and actuating lever at a predetermined point in the stroke of the carriage, a slide on said carriage operatively associated with said actuating lever, and means for actuating said slide as the carriage is reciprocated adjustable to vary the timing and the character of the stroke of the slide.

38. The combination of a forming member, means for feeding stock to said member, a forming lever operatively connected to said forming member, a reciprocating carriage, connections for said carriage to said forming lever including an actuating lever mounted on said carriage, means for disconnecting said forming lever and actuating lever at a predetermined point in the stroke of the carriage, a slide on said carriage operatively associated with said actuating lever, and means for actuating said slide as the carriage is reciprocated.

39. The combination of a forming member, means for feeding stock to said member, a forming lever operatively connected to said forming member, a reciprocating carriage, connections for said carriage to said forming lever, and means for disconnecting said carriage and lever at a predetermined point in the stroke of the carriage.

BERNARD HEILMAN.
EARL PECK.